US00RE38006E

(19) United States
(12) Reissued Patent
Furuhata et al.

(10) Patent Number: US RE38,006 E
(45) Date of Reissued Patent: Feb. 25, 2003

(54) PROJECTOR

(75) Inventors: Mutsuya Furuhata, Suwa (JP); Takeshi Takizawa, Suwa (JP); Motoyuki Fujimori, Suwa (JP); Akitoshi Kuroda, Suwa (JP); Shinji Haba, Suwa (JP); Kiyoshi Miyashita, Suwa (JP)

(73) Assignee: Seiko Epson Corporation, Tokyo (JP)

(21) Appl. No.: 09/941,935

(22) Filed: Sep. 13, 2001

Related U.S. Patent Documents

Reissue of:
(64) Patent No.: 5,951,136
Issued: Sep. 14, 1999
Appl. No.: 08/943,730
Filed: Oct. 3, 1997

(30) Foreign Application Priority Data

Oct. 4, 1996 (JP) ..... 8-264951
Oct. 28, 1996 (JP) ..... 8-285690
Aug. 26, 1997 (JP) ..... 9-229541

(51) Int. Cl.[7] ..... G03B 21/00; G03B 21/16
(52) U.S. Cl. ..... 353/31; 353/61
(58) Field of Search ..... 353/31, 33, 34, 353/52, 57, 61, 122; 362/293; 349/58, 62, 67; 359/40, 41

(56) References Cited

U.S. PATENT DOCUMENTS 5,381,278 A * 1/1995 Shingaki et al. ..... 359/256
5,418,586 A * 5/1995 Fujimori et al. ..... 353/122
5,555,186 A 9/1996 Shioya ..... 359/40
5,666,171 A * 9/1997 Nakamura et al. ..... 349/58
5,676,442 A * 10/1997 Fujimori ..... 353/119
5,764,412 A * 6/1998 Suzuki et al. ..... 359/487

FOREIGN PATENT DOCUMENTS

| | | | |
|---|---|---|---|
| EP | 0 526 653 A1 | * | 2/1993 |
| JP | 7-225379 | * | 8/1995 |
| JP | 7-311372 | * | 11/1995 |
| JP | 08043785 | * | 2/1996 |
| JP | 8-68978 | | 3/1996 |
| JP | 08068978 | * | 3/1996 |
| JP | 08094990 | * | 4/1996 |
| WO | WO96/20424 | * | 7/1996 |

* cited by examiner

*Primary Examiner*—Russell Adams
*Assistant Examiner*—Hung Henry Nguyen
(74) *Attorney, Agent, or Firm*—Oliff & Berridge, PLC

(57) ABSTRACT

A [projection display device] *projector* capable of improving cooling efficiency of the power unit includes a light source lamp unit, a projection lens unit, an exhaust fan provided near the light source lamp unit for ventilating an outer case, and a ventilating path provided inside the power unit. A suction fan is provided at the inlet of the ventilating path which is connected to the cooling air intake port through a duct cover to directly conduct fresh air into the ventilating path. Because the interior of the power unit is cooled by fresh air which is cooler than the air inside the outer case, cooling efficiency is enhanced.

11 Claims, 7 Drawing Sheets

PROJECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a projection display apparatus which separates light beams from a light source into red, blue and green light beams. The display apparatus modulates the red, blue and green light beams through light valves provided in a liquid crystal panel in response to image information. The modulated red, blue and green light beams are combined and expansively projected through a projection lens on a projection screen. In particular, the invention relates to a cooling system for efficiently and cleanly cooling the components of a projection display device that separates, modulates combines and projects light beams.

2. Description of Related Art

Conventional projection display devices include an optical unit which optically treats light beams emitted from a light source lamp unit to synthesize a color image in response to image information. The synthesized light beams are projected on a screen through the use of a projection lens unit, a power unit, and a circuit board unit including control circuits and similar devices.

The optical unit separates light beams emitted from the light source lamp unit into red, blue and green color light beams. The optical unit modulates these color light beams with light valves provided in a liquid crystal panel in response to image information. The modulated color light beams are recombined with a cross dichroic prism or similar devices, and are projected on a screen.

Japanese Patent Publications No. 7-225379 discloses a projection display apparatus provided with a polarized light conversion device for aligning the polarization direction of light beams emitted from a light source lamp unit. The polarized light conversion device has a polarized beam splitter array provided with a plurality of sets of polarized light separating films and reflection films which are parallel to each other. The polarized beam splitter array separates incident light beams into two types of straight polarized light components, and aligns the polarization direction of these two types of straight polarized light components.

Some elements of the projection display apparatus, e.g. the polarized light conversion device and the optical unit, are stored in an outer case. A projection side of the projection lens unit is disposed in the outer case such that it protrudes from the front face of the outer case. The outer case is provided with an operating section including a power switch, a light-receiving window for remote control, and an input/output terminal group for sending and receiving signals to and from external devices.

Conventional projection display devices include optical devices in the light source lamp unit, a power unit and an optical unit, all of which are sources of heat. The liquid crystal light valves and their respective polarization plates are major heat sources because they absorb part of the transmitted light beams.

In order to cool the heat sources, the projection display apparatus is provided with a cooling system.

The cooling system introduces fresh air into the outer case through an intake port by a suction fan. The introduced air is circulated through the outer case and exhausted through an air outlet provided on the outer case by an exhaust fan.

In such a cooling system, the power unit, which often become very hot, is provided with a suction fan to introduce the air in the outer case to the interior of the power unit for cooling.

The power unit includes a primary active filter, a power supply, and a ballast. A transmitter FET may be mounted on the circuit board of the primary active filter. A rectifier diode bridge, an oscillating transistor for a D/D converter and a triode regulator for a D/D converter may be mounted on the circuit board of the power supply. Also, devices such as a driving FET for a chopper circuit and a reverse-current preventing diode for a chopper circuit may be mounted on the circuit board of the ballast. Because these devices are heat sources, heat sinks are fixed to them to enhance cooling efficiency. Air introduced with the suction fan cools the heat sinks.

By the time that air is introduced to the power unit in the outer case, it has already been heated by many other elements located in the outer case. Thus, the air introduced to the power unit is hotter than the fresh air introduced into the outer case, and is less efficient in cooling the power unit.

Also, when the air in the outer case is drawn with the suction fan, fresh air containing dust may be introduced through openings of the outer case, e.g., the gap between the projection lens unit and the outer case. As a result, dust may adhere to the optical system and deteriorate the display quality, which reduces the reliability of the apparatus.

The polarized light conversion device is heated because the polarized light separating film and the reflection film absorb some of the incident light. The device has no separate cooling means even though it must be cooled. The polarized light conversion device is therefore cooled by the air circulating from the suction fan to the outlet. Thus, the device may not be efficiently cooled due to insufficient circulation of the cooling air in some apparatus configurations.

SUMMARY OF THE INVENTION

It is therefore an object of the invention to provide a projection display apparatus that includes a cooling system that efficiently cools the power unit and polarized light conversion device while preventing airborne debris from contaminating the apparatus.

In accordance with a first embodiment of the invention, a projection display apparatus includes an optical unit for forming an optical image in response to image information by optically treating light beams emitted from a light source lamp unit and for expansively projecting the optical image on a projection area through a projection lens. The projection display device includes a power unit with a ventilating path provided inside the power unit for circulating cooling air. An outer case stores the optical unit and the power unit. The projection display apparatus further includes a cooling air intake port formed on the outer case and a cooling air conducting means for directly conducting fresh air from outside the outer case from the cooling air intake port to the inlet of the ventilating path.

Because the cooling air conducting means directly conducts fresh air to the ventilating path, and because fresh air is cooler than the air in the outer case, the interior of the power unit can be cooled with high efficiency.

A ventilating fan for ventilating the interior of the outer case is preferably provided near the light source lamp unit. The air in the outer case, including the air exhausted from the ventilating path, is collected near the light source lamp unit before being exhausted to the exterior. Thus, the heated light source lamp unit can be securely cooled.

It is preferred that the cooling air conducting means include a duct section connecting the cooling air intake port and the inlet of the ventilating path. Accordingly, the duct section only introduces fresh air from the cooling air intake port to the ventilating path. The duct section also prevents the air from the outer case, which is hotter than the fresh air, from entering into the ventilating path. The interior of the power unit can therefore be more efficiently cooled.

The cooling air conducting means may also include a suction fan provided at the inlet of the ventilating path for drawing fresh air into the ventilating path. A large volume of fresh air can therefore be stably supplied to the ventilating path, and the power unit can be securely cooled with high efficiency.

The duct section securely prevents the suction fan from drawing dust into the outer case through openings in the outer case such as the gap between the projection lens unit and the outer case. Dust can therefore be prevented from adhering onto the optical system, which provides high image display quality and satisfactory reliability.

Although the power unit provided with the suction fan does not have to be located inside the outer case, the optical path from the light source lamp unit to the projection lens unit must be provided within the narrow space in the outer case of the projection display apparatus. The power unit is preferably arranged so that the suction fan is located in the free space in the outer case in order to effectively use the space in the outer case.

The projection lens may be provided so as to have an edge protrude from the outer case. The suction fan may be located on the base end of the projection lens unit, and the cooling air intake port may be formed in a region of a bottom wall of the outer case which includes the lower side of the projection lens unit.

In the optical unit, the projection lens unit may protrude from the light source lamp unit and the optical devices so that the combined light from the optical device is incident on the base end of the projection lens. When the projection lens unit is arranged so as to have a front end protrude from the outer case, a dead space is formed at the side of the base end of the projection lens.

Because the power unit has a suction fan located on the base end of the projection lens unit, the apparatus can be miniaturized as a result of the effective use of space in the outer case.

Further, because the cooling air intake port is formed in a region of the lower side of the projection lens unit, the duct section can be provided in the dead space running from the lower side of the projection lens unit to the side of its base end. Accordingly, space in the outer case is effectively used.

In accordance with another aspect of the invention, a projection display apparatus includes an optical unit including a light source lamp unit and a projection lens unit for forming an optical image in response to image information. The apparatus optically treats light beams emitted from the light source lamp unit and expansively projects the optical image on a projection screen through the projection lens unit. An outer case for storing the optical unit and a power unit includes a ventilating fan for ventilating the interior of the outer case near the light source lamp unit. The projection display apparatus further includes a polarized light conversion device facing an emitting surface of the light source lamp unit for separating the light beams emitted from the light source lamp unit into two types of straight polarized light components and for aligning the polarizing direction of the straight polarized light components. A ventilating path is provided inside the outer case for circulating cooling air along at least one face among a light incident face and a light emerging face of the polarized light conversion device.

Because the ventilating path circulates the cooling air along at least one face among the light incident face and the light emerging face of the polarized light conversion device, the cooling air can securely circulate near the polarized light conversion device to achieve satisfactory cooling effects regardless of the configuration of the apparatus.

A guide is preferably provided for introducing the cooling air circulated along at least one face among the light incident face and light emerging face of the polarized light conversion device to the light source lamp unit.

In such an apparatus, the guide introduces the cooling air after cooling the polarized light conversion device to the light source lamp unit to effectively cool the light source lamp unit. The lamp life is therefore prolonged, and replacement of the lamp is required less frequently.

The outer case may be provided with an operating section having a plurality of switches including a main on/off switch for main power. A protruding section may protrude from the main switch between the main switch and the switch adjacent to the main switch. Such a structure prevents erroneous operation of the main switch.

The protruding section is preferably provided along the periphery of the main switch. This structure also prevents careless contact with the main switch and thus securely prevents erroneous operation of the switch.

A circuit board may be provided in the optical unit. A temperature-sensing element may be connected to the circuit board and located near the light source lamp unit to monitor the temperature of the lamp.

Such a structure effectively monitors the temperature of the light source lamp unit while obviating wiring between the temperature-sensing element and the circuit board because the temperature-sensing element is directly mounted on the circuit board.

BRIEF DESCRIPTION OF THE DRAWINGS

The above and other aspects and advantages of the invention will become apparent from the following detailed description of preferred embodiments when taken in conjunction with the accompanying drawings, in which.

DETAILED DESCRIPTION OF PREFERRED EMBODIMENTS

Figure 1:
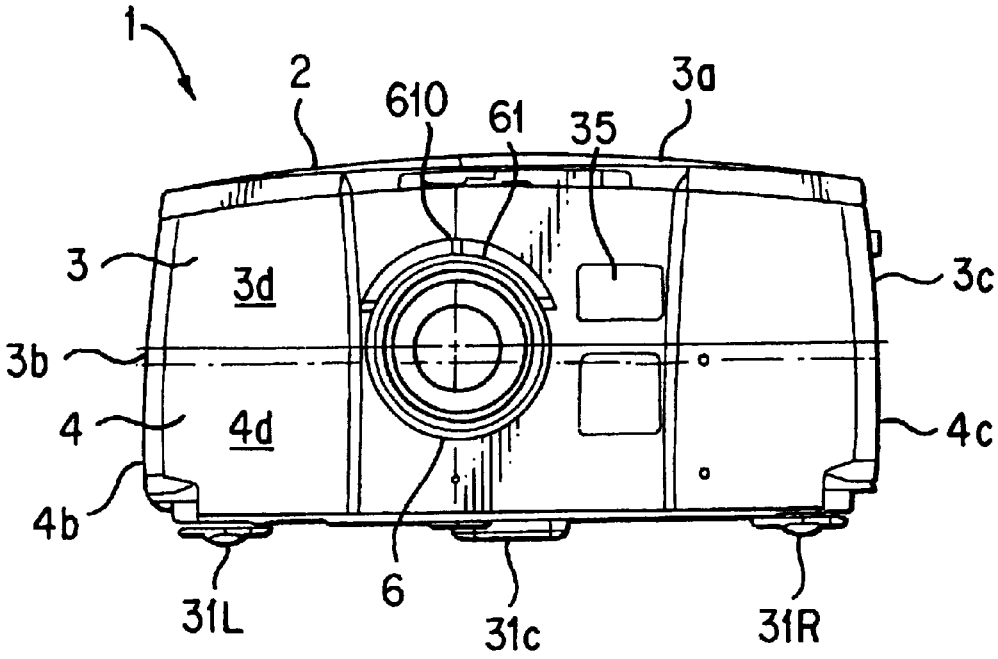
FIG. 1(A) is a front view and FIG. 1(B) is a rear elevational view of a projection display apparatus in accordance with a preferred embodiment of the invention.
Figure 1:
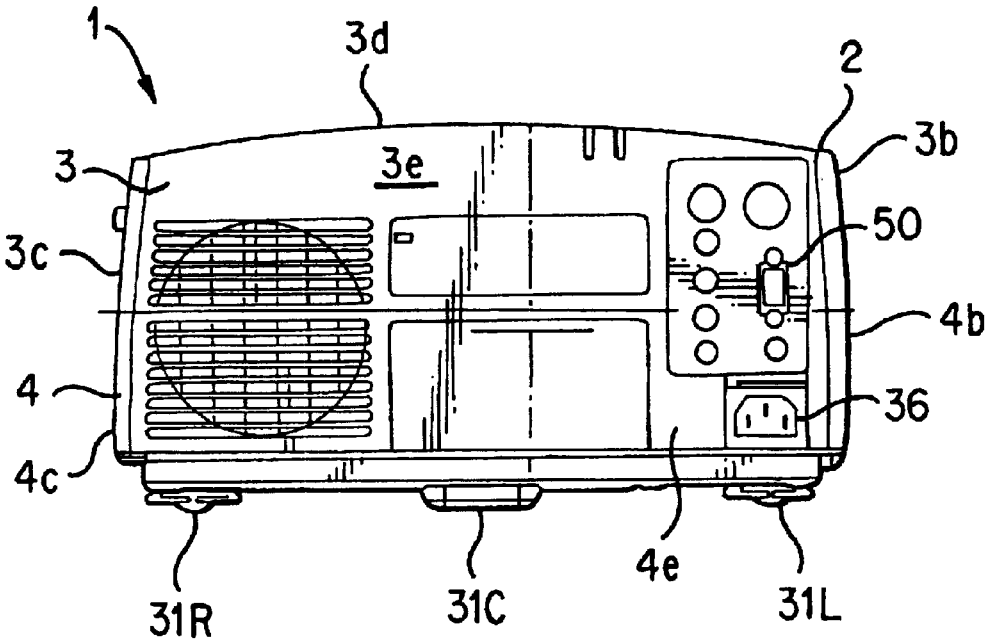

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

Figure 2A:
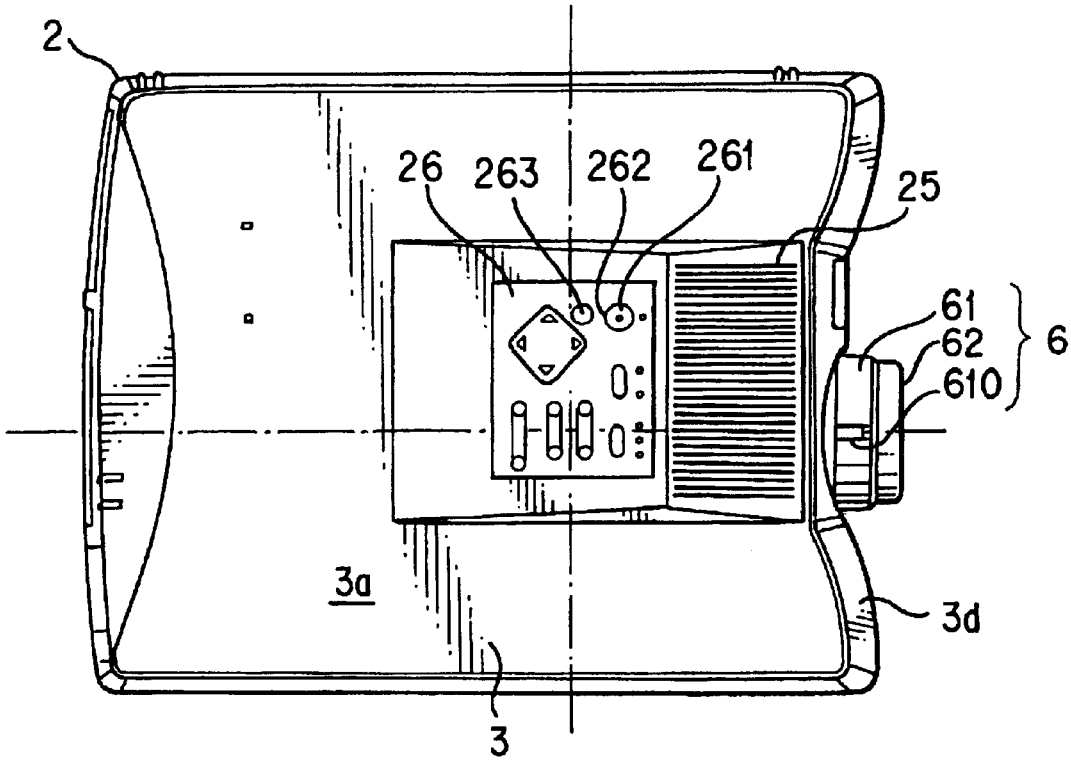
FIG. 2(A) is a top view and FIG. 2(B) is a bottom view of the projection display apparatus in accordance with the preferred embodiment of the invention.
Figure 2B:
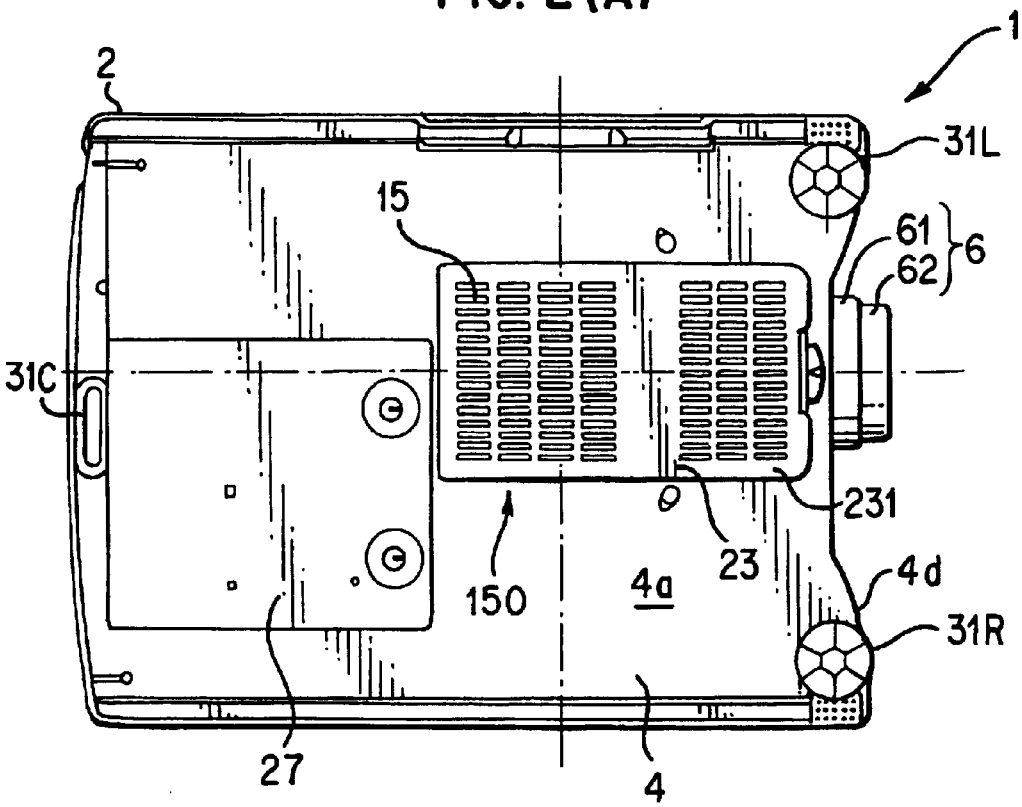

FIGS. 1(A) and 1(B) are a front view and a rear elevation view, respectively, of a projection display apparatus in accordance with a preferred embodiment of the invention FIGS. 2(A) and 2(B) are a plan view and a bottom view, respectively, of the projection display apparatus in accordance with the preferred embodiment of the invention.

As shown in FIGS. 1(A)–2(B), the projection display apparatus 1 in accordance with the preferred embodiment has a rectangular parallelepiped outer case 2. The outer case 2 may include an upper case 3 and a lower case 4. The rear wall of the outer case 2 is provided with an AC inlet 36 for supplying external power to the apparatus and an input/output terminal group 50. The apparatus is user-friendly because no signal cables or similar devices are placed on the side at which users generally stand.

The upper case 3 of the outer case 2 includes a rectangular top wall 3a, left and right side walls 3b and 3c, a front wall 3d and a rear wall 3e. The front wall 3d and rear wall 3e extend vertically from the four sides of the upper wall toward the lower side. The lower case 4 includes a rectangular bottom wall 4a, left and right side walls 4b and 4c, a front wall 4d and a rear wall 43. The front wall 4d and rear wall 4e vertically extend from the four sides of the bottom wall.

The front wall 3d and the front wall 4d are dented on slightly left portion of the center as shown in FIG. 2. The front end of a projection lens unit 6 extends toward the front side of the apparatus from a circular opening formed thereon, and the top of the projection lens unit protrudes from the front face of the outer case 2.

A zoom ring 61 holding a zoom lens in the protruding section of the outer case 2 has a protuberance 610, such as a linear knob, extending to the axis line direction. The zoom ring 61 and a focus ring 62 can therefore be tactily distinguished from each other and easily rotated. The protuberance 610 may be provided on the focus ring 62 as long as it does not prevent motion of the focus ring 62.

As shown in FIG. 1(A), a light-receiving window 35 is provided on the front wall 3d of the upper case 3 on the right of the projection lens unit 6. The receiving window 35 is provided for receiving control light beams passing through a remote controller not shown in the drawings.

As shown in FIG. 2(A), a number of holes 25 are formed in the center of the front side of the top wall 3a of the upper case 3. A self-contained speaker (not shown in the drawings) may be located behind the top wall 3a.

The center of the front side of the top wall 3a is also provided with an operating switch section 26. A main switch 261 for turning on/off the main power includes a protuberance section 262 provided between the main switch 261 and the adjacent switch 263 among switches formed on the operating switch section 26. The protuberance section 262 protrudes from the main switch 261 and has an arc shape along the periphery of the circular main switch 261. The protuberance is preferably located along the periphery of the main switch 216 along a 90 degree arc. Because the arc protuberance 262 protrudes from the top of the main switch 261, other switches can be operated without erroneously touching the main switch 261. Erroneous operation of the main switch can therefore be securely prevented.

A foot 31C is provided in the center of the rear end of the bottom wall 4a of the lower case 4, and feet 31R and 31L are provided on the left and right sides of the front end. The height of the left and right feet 31R and 31L, as measured from the bottom wall 4a, is adjustable by turning the feet.

Figure 3:
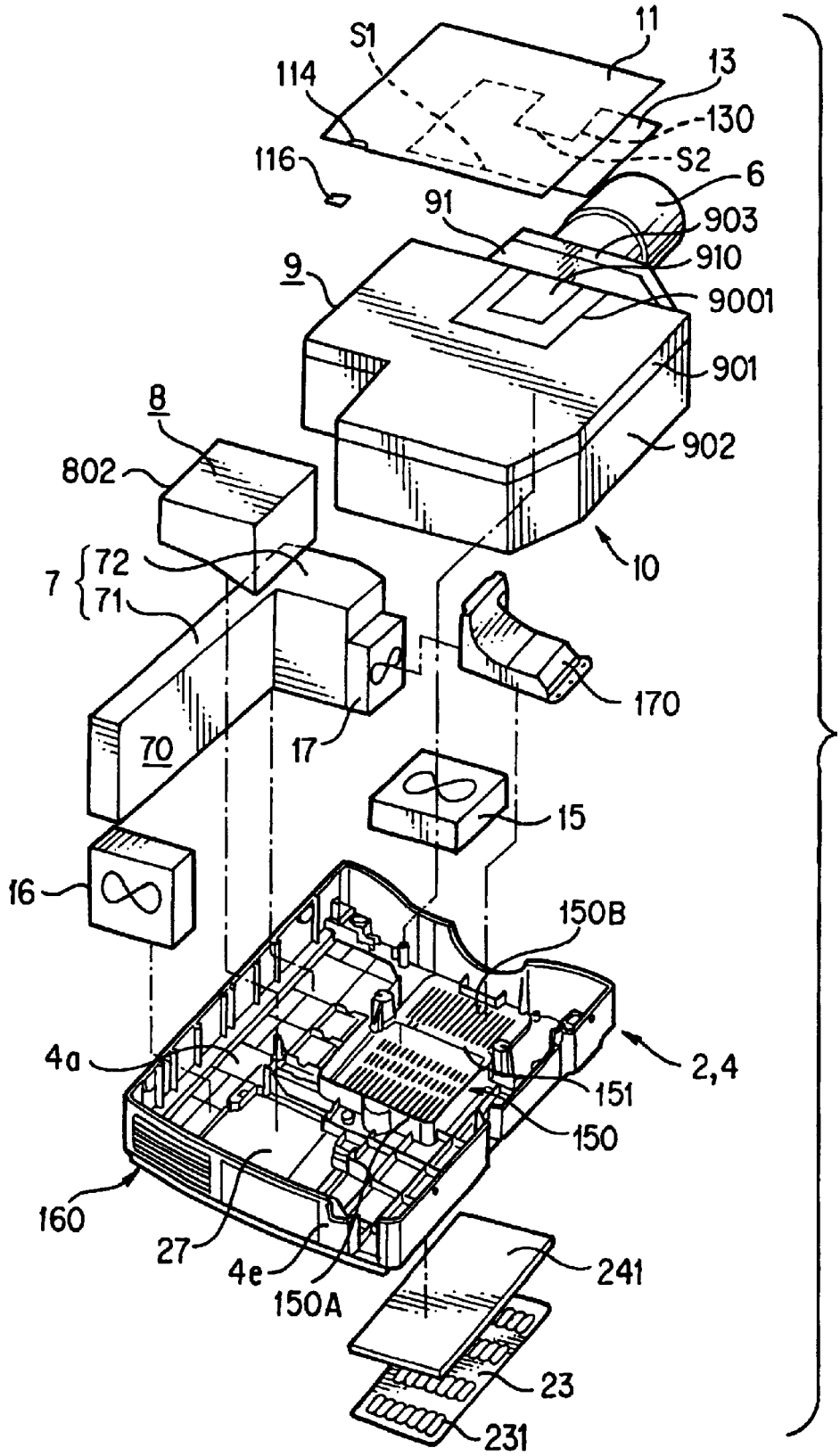
FIG. 3 is an exploded perspective view showing the optical system and the power unit in accordance with the preferred embodiment of the invention.

FIG. 3 shows an arrangement of individual components inside the outer case 2 of the projection display apparatus 1. The outer case 2 is provided with an optical unit 10 including the above-mentioned projection lens unit 6 and a power unit 7 adjacent to each other therein. A control board 13 for controlling the apparatus and a video board 11 are stacked on the optical unit 10.

The optical unit 10 includes a light source lamp unit 8 that includes a light source lamp 81 (shown in FIG. 4) stored in a housing 802. An optical lens unit 9 optically treats the light beams emitted from the light source lamp unit 8 and forms an optical image in response to image information. A projection lens unit 6 expansively projects the optical image onto a projection screen. The optical unit 10 occupies at least the right half of the internal space of the outer case 2.

The optical lens unit 9 includes a prism unit 910 and upper and lower light guides 901 and 902 containing various optical devices as described below. The upper and lower light guides 901 and 902 are fixed to the upper case 3 and the lower case 4 shown in FIGS. 1(A) and 2(B), respectively, with fixing screws.

A rectangular cutout 9001 in the plan view shown in FIG. 3 is formed in the center on the front side of the light guides 901 and 902 to facilitate assembly of the prism unit 910.

The prism unit 910 is attached to a thick die-case head plate 903 formed of magnesium of aluminum, and is fixed to the light guides 901 and 902 via the head plate 903.

The head plate 903 is L-shaped which includes a vertical wall 91 along the width direction of the apparatus and a bottom wall 92 (shown in FIG. 7) horizontally extending from the bottom of the vertical wall 91. The prism unit 910 is fixed on the bottom wall 92. In the center of the vertical wall 91, a rectangular opening (not shown) is provided as a passageway for the light emerging from the prism unit 910. The base end of the projection lens unit 9 is fixed to the rectangular opening. The prism unit 910 and the projection lens unit 6 are fixed to the optical lens unit 9 so as to sandwich the stiff vertical wall 91 therebetween after the optical system is aligned. These units are therefore formed integrally, and misalignment of the optical system due to strong impact will rarely occur.

The base end of the projection lens unit 6 is located in the center of the front side of the optical lens unit 9, and a gap in response to the protruded length of the projection lens unit 6 from the outer case 2 is formed on the side of the base end, i.e., between the head plate 903 and the front walls 3d and 4d of the outer case 2.

The corner portion of the rear section of optical lens unit 9 at the side of the power unit 7 includes an indent, and the light source lamp unit 8 is assembled in the indent. That is, the light source lamp unit 8 is provided at a rectangular area formed by the rear end of the power unit 7 and the indent in the optical lens unit 9.

A lamp-replacement cover 27 is fixed with a screw to the bottom of wall 4a of the lower case 4. A lamp can be replaced by loosening the screw and removing the cover 27 to expose the light source lamp unit.

A control board 13 for controlling the apparatus is fixed with screws on the upper face of the optical lens unit 9. A video board 11 including a video signal treating circuit is provided on the control board 13.

Because the control board 13 is fixed to the upper face of the optical unit 10 with screws, the control board 13 and the optical unit 10 can be tested using external power even when the whole assembly is not completed, such as in OEM production in which the control board 13 and the optical unit 10 are fixed. The control board 13 has a cutout section 130 at a location corresponding to, and overlapping with, the prism unit 910. The boards 11 and 13 are electrically connected to each other through connectors 114 and 116.

The power unit 7 is disposed on the left side of the optical unit 10 in the left side of the outer case 2 in the rear view of the display apparatus 1 as shown in FIG. 3.

The power unit 7 has an L shape to match the shape of the space between the outer case 2 and the optical unit 10. The power unit includes a main body 71 located from the rear to the front of the apparatus and includes an extension 72 bending from the front end of the main body 71. The extension 72 is located at the side of the base end of the projection lens unit 6.

The gap at the side of the base end of the projection lens unit 6, which increases as the protruded length of the projection lens unit 6 from the front end of the outer case 2 decreases, is filled with the extension 72 of the power unit 7. The interior of the outer case 2 is therefore effectively used to minimize the projection display apparatus 1.

The power unit 7 contains various electronic parts in an L-shaped metallic shield case 70. The shield case 70 acts as a ventilating path for circulating cooling air in the power unit 7. Also, the shield case 70 prevents leakage of electrical and magnetic noises generated in the power unit 7, and shields AC input and output lines accompanied with the power unit 7 to shut out noises generated from them.

The shield case 70 stores a primary active filter, a power supply, and a ballast or similar device not shown in the drawings. These devices may include circuit boards including various electronic components. For example, the circuit board of the primary device active filter includes components such as a transmission FET. The circuit board of the power supply includes a rectifier diode bridge, an oscillating transistor for a D/D converter and a triode regulator for a D/D converter. The circuit board of the ballast includes a driving FET for a chopper circuit and a reverse-circuit preventing diode for a chopper circuit. Because these devices are heat sources, they are fixed to heat sinks to enhance cooling efficiency.

Various optical parts are densely packed in the outer case 2 so as not to form a dead space. It is therefore difficult to provide a conventional metallic chassis over the entire outer case 2. A flexible shielding sheet (not shown) can cover the entire case without forming a dead space.

The optical system assembled in the optical unit 10 is described with reference to FIG. 4. The optical system in accordance with this embodiment includes an illuminating optical system 923 that includes a light source lamp unit 8, integrator lenses 921 and 922 and a polarized light conversion device 920. The optical system includes a color-separating optical system 924 for separating the light beams W emerging from the illuminating optical system 923 into red (R), green (G) and blue (B) light beams. Three liquid crystal light valves 925R, 925G and 925B modulate the color light beams. A prism unit 910 recombines the modulated light beams and a projection lens unit 6 expansively projects the recombined light beams on a screen.

The light source lamp 81 of the light source lamp unit 8 is provided with a lamp 805 such as a halogen lamp, a reflector 806 and a glass face 807 adhered to the front surface of the reflector 806. The light source lamp 81 is stored in a housing 802 so as to expose the glass face 807 (see FIGS. 3 and 8). The light from the lamp 805 emerges toward the integrator lens 921 of the optical lens unit 9 through the glass face 807 in the direction perpendicular to the direction of the apparatus 1.

The light source lamp 81 may be a halogen lamp, a metal halide lamp, a xenon lamp or the like.

The illuminating optical system 923 includes two integrator lenses 921 and 922, each of which includes a matrix of fine lenses. A polarized light conversion device 920 is disposed parallel to the integrated lenses 921 and 922 and a collective lens 930 is disposed perpendicular to the polarized light conversion device 920. A reflection mirror 931 is provided in front of the collective lens 930, i.e., between the polarized light conversion device 920 and the collective lens 930. The reflection mirror 931 perpendicularly reflects the central optical axis 1a from the light source lamp 81 toward the front section of the apparatus.

The integrator lens 921 divides the light beams from the light source lamp unit 8 into a plurality of partial light beams which are collected near the integrator lens 922.

The integrator lens 922 arranges central optical paths of partial light beams from the integrator lens 921 so as to be parallel to the optical axis 1a. When light beams from the light source lamp unit 8 are perfectly parallel to the optical axis 1a, the central optical path of each partial light beam from the integrator lens 921 is also parallel to the optical axis 1a. Therefore, the integrator lens 922 may be omitted when the light beams from the light source lamp unit 8 are highly parallel to the optical axis 1a.

The collective lens 930 collects partial light beams onto the light waves 925R, 925G and 925B.

As described above, in the projection display apparatus 1 in accordance with this embodiment, the light beams from the light source lamp unit 8 are divided into a plurality of partial light beams with the integrator lens 921. The partial light beams are collected onto the liquid crystal light valves 925R, 925G and 925B by the collective lens 930. Therefore, the liquid crystal light valves 925R, 925G and 925B can be illuminated with substantially uniform light, resulting in an image having less irregular illumination.

Figure 5A:
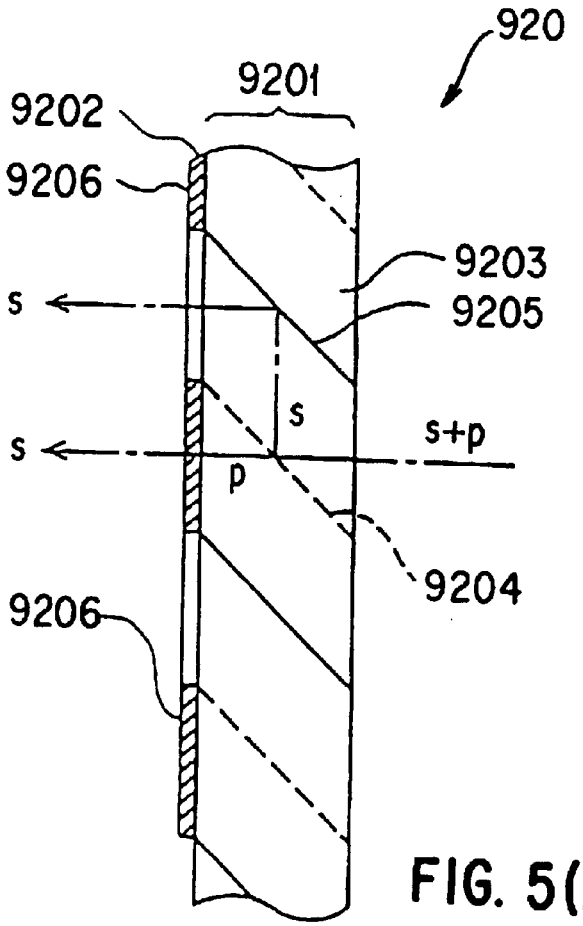
FIG. 5(A) is a cross-sectional view and FIG. 5(B) is an isometric view of the polarized light conversion device in accordance with the preferred embodiment of the invention.
Figure 5B:
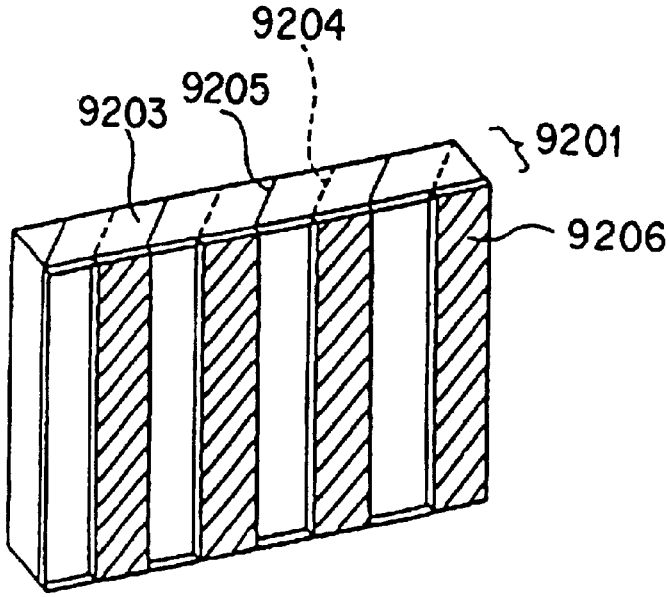

The polarized light conversion device 290 includes an integration of a polarized light separation film and a $\lambda/2$ phase plate in which the incident light is separated into P-polarized light and S-polarized light and then unified into S-polarized light. As shown in FIG. 5, the polarized light conversion device 920 is provided with a polarized beam splitter array 9201 and a selective phase plate 9202. The polarized beam splitter array 9201 includes a plurality of pillar transparent plates 9203 each bonded to each other and having a cross-section in the form of a parallelogram.

Polarized light separation films 9204 and reflection films 9205 are alternately disposed between the transparent plates. The polarized beam splitter array 9201 is made by bonding a plurality of glass plates having these films 9204 and reflection films 9205. The glass plates are obliquely cut at a given angle.

The unpolarized light from the integrator lenses 921 and 922 (shown in FIG. 4) is separated into S-polarized light and P-polarized light with the polarized light separation film 9204. The S-polarized light is substantially vertically reflected by the polarized light separation film 9204 and vertically reflected by the reflection film 9205. The P-polarized light passes through the polarized light separation film 9204. The selective phase plate 9202 comprises a $\lambda/2$ phase layer 9206 formed on the surface of the transparent plate 9203 which transmits the light passing through the polarized light separation film 9204. The $\lambda/2$ phase layer is not formed on the surface of the transparent plate 9203 which transmits the light reflected from the reflection film 9205. The P-polarized light passing through the polarized light separation film 9204 therefore emerges after being converted to S-polarized light by the $\lambda/2$ phase layer 9206. As a result, substantially S-polarized light beams emerge from the polarized light conversion device 920.

The use of only the S-polarized light improves color separation characteristics of dichoric mirrors 941 and 942 (shown in FIG. 4) of the color separating optical system 924 described below in relation to use of unpolarized light. Further, the S-polarized light has a higher reflectance than that of the P-polarized light to the mirror, and thus light loss by reflection can be suppressed.

Figure 4:
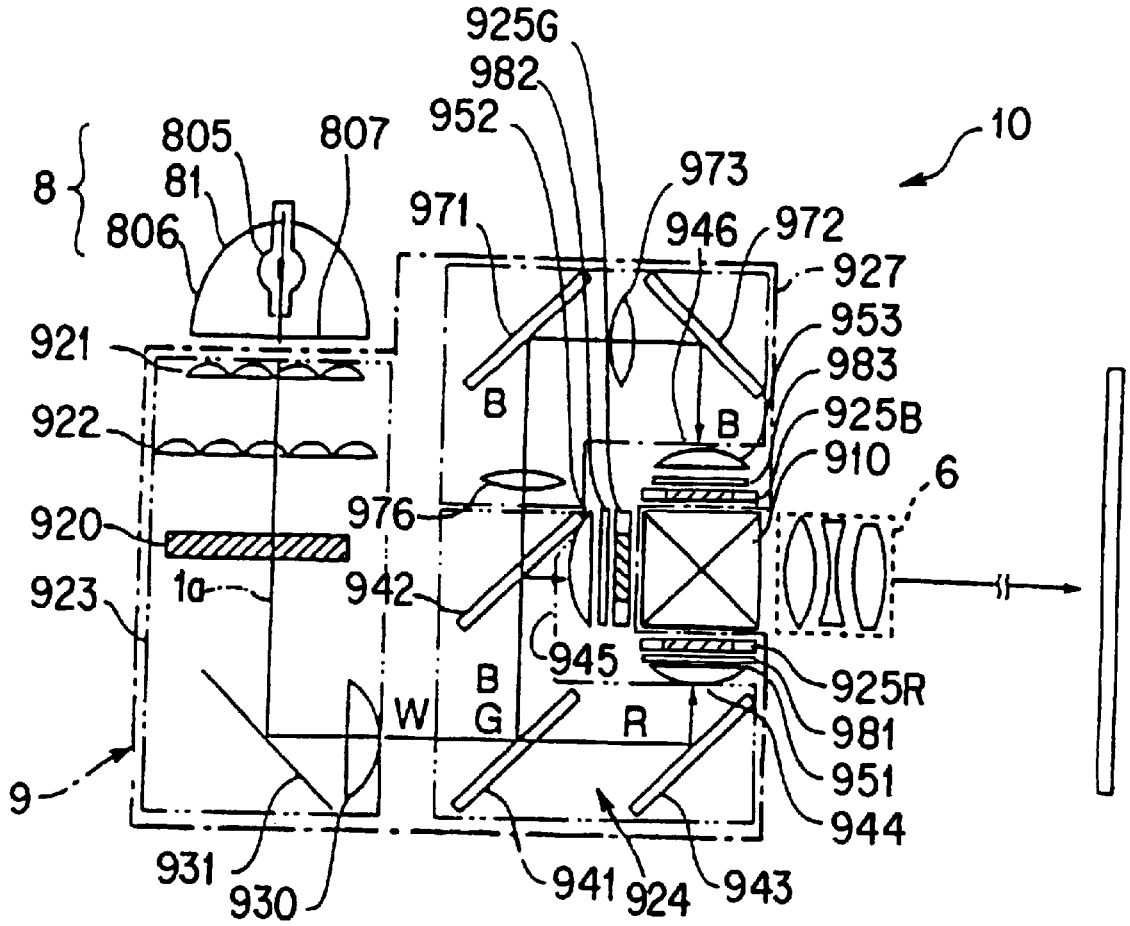
FIG. 4 is a schematic representation of the optical system in accordance with the preferred embodiment of the invention.

Referring to FIG. 4, the color separating optical system 924 includes a blue and green light reflecting device mirror 941, a green light reflecting dichoric mirror 942 and a reflection mirror 943.

In the color separating optical system 924, light beams (W) are radiated to the blue and green light reflecting dichroic mirror 941, and the red light beam passing through the mirror 941 is perpendicularly reflected by a rear reflection mirror 943 and emerges from a red light emerging section 944 toward a prism unit 910.

Blue light beams (B) and green light beams (G) in the light beams (W) are perpendicularly reflected by the blue and green light reflecting dichroic mirror 941 toward the green light reflecting dichroic mirror 942. Only green light beams are perpendicularly reflected by the green light reflecting dichoric mirror 942 and emerge from a green light emerging section 945 toward the prism unit 910. The blue light beams (B) passing through the green light reflecting dichroic mirror 942 emerge from a blue light emerging section 946 through a light-guiding system 927 toward the prism unit 910.

The light-guiding system 927 leads the blue light beams (B) to the corresponding liquid crystal light valve 925B and includes an incident side reflection mirror 971, an emerging side reflection mirror 972, an intermediate lens 973 provided therebetween and a collective lens 976 provided ahead of the incident state reflection mirror 971. The distance to the blue (B) light emerging section 946 is the longest among distances from the illuminating optical system 923 to red (R), green (G) and blue (B) light emerging sections 944, 945 and 946. Provision of the light-guiding system 927 prevents light loss.

Red (R) and blue (B) light emerging sections 944 and 945 of the color separating optical system 924 are provided with collective lenses 951 and 952, respectively. Red light beams (R) and green light beams (G) emerging from their respective emerging sections 944 and 945 are paralleled by their respective collective lenses 951 and 952.

Parallel red light beams (R) and green light beams (G) are incident on liquid crystal light valves 925R and 925G through polarizing plates 981 and 982 and are modulated into image information. A driving means (not shown) switches the light valves 925R and 925G in response to the image information to modulate color light beams passing through.

As with the red and green light beams (R) and (G), the blue light beams (B) passing through the light-guiding system 927 are paralleled by the collective lens 953 provided at the blue (B) light emerging section 946. The blue light beams are incident on the liquid crystal valve 925B through a polarizing plate 983, and are modulated in response to the image information.

The liquid crystal valves 925R, 925G and 925B may use a polysilicon TFT as a switching device.

The modulated color light beams from the liquid crystal panels 925R, 925G and 925B are incident on the prism unit 910, which includes a dichroic prism, and are recombined. The recombined color image is expansively projected through the projection lens unit 6 onto a projection screen provided at a given position.

In the optical unit 10 in accordance with this embodiment, the illuminating optical system 923, the color separating optical system 924, the liquid crystal light valves 925R, 925G and 925B, the polarizing plates 981 to 983, and the light-guiding system 927 are arranged in the above-mentioned light guides 901 and 902 (shown in FIG. 3) after the optical axis is aligned.

In this embodiment, light beams emitted from the light source lamp unit 8 are reflected by the reflection mirror 931, travel a long L-shaped optical path and reach the prism unit 910 through the color separating optical system 924. The optical path is therefore preferred to be as long as possible, since individual optical parts are arranged in the narrow region. Thus, the light beams from the light source lamp unit 8 are paralleled and transmitted to the liquid crystal valves 925R, 925G, and 925B while lenses having low F values are used and positioning space of the integrator lenses 921 and 922 and the polarized light conversion device 920 are sufficiently secured. Since a wide space is secured for the integrator lenses 921 and 922, the number of division of the lenses can be increased. The integrator lenses 921 and 922, therefore, can be arranged close to each other, resulting in miniaturization of the apparatus.

The structure for cooling the projection display apparatus in accordance with the embodiment is described with reference to FIGS. 3, 6 and 7. In the apparatus 1, fresh air (cooling air) drawn from a cooling air intake port 150 formed in the outer case 2 is circulated in the outer case 2 to cool heat sources in the case 2. The air is exhausted from an air outlet 160 on the rear end of the outer case 2.

The cooling air intake port 150 includes a plurality of vent holes 151 formed on the bottom wall 4a of the lower case 4 shown in FIG. 3. These vent holes 151 are formed over the region 150A under the prism unit 910 and the region 150B under the base end of the projection lens unit 6.

A spongy air filter 241 covers the entire region 150A and 150B having the vent holes 151. An air filter cover 23 is fixed with screws to the exterior of the bottom wall 4a of the lower case 4 to enclose the spongy filter 241. The air filter cover 23 also has a number of vent holes 231. The air filter is provided so as to cover both regions 150A of the optical lens unit 9 and 150B of the projection lens unit 6. A single cover structure saves labor for exchanging the air filter 241 and improves dust control.

Figure 7:
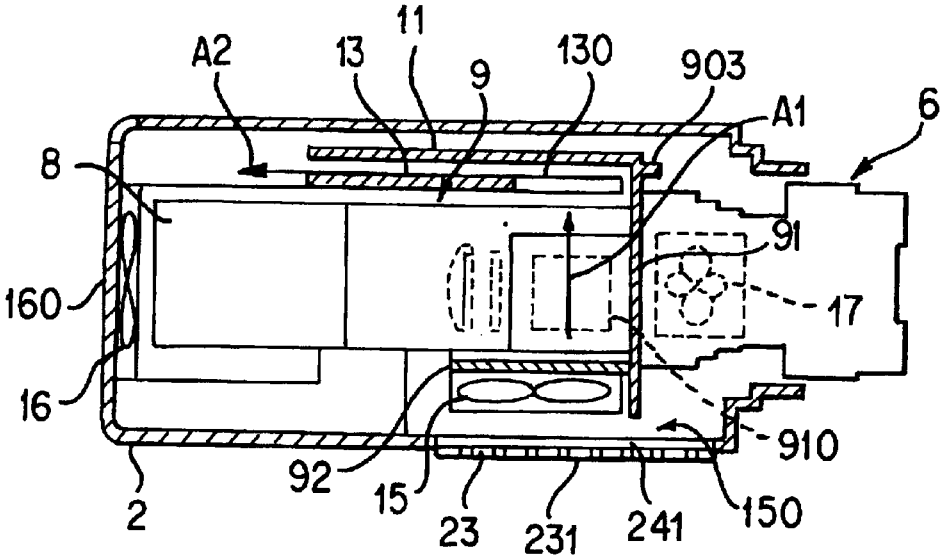
FIG. 7 is a cross-sectional view showing the stream of cooling air in the projection display apparatus in accordance with the preferred embodiment of the invention.

The second half of the cooling air intake port 150., i.e., the region 150A under the prism unit 910, is provided with a suction fan 15 as shown in FIG. 7. The suction fan 15 is fixed to the lower face of the bottom wall 92 of the head plate 903 mounting the prism unit 910. The bottom wall 92 of the head plate 903 is provided with a vent hole (not shown) for circulating the cooling air.

The first half of the cooling air intake port 150, i.e., the region 150B under the projection lens unit 6, is formed near the extension 72 of the power unit 7 which is located on the base end of the projection lens unit 6. As shown FIG. 6, the end of the extension 72, i.e., the end of the shield case 70 at the side of the projection lens unit 6, is used as an inlet for a ventilating path formed in the case 70. The rear end of the main body 71 or the end of the shield case 70 is used as an outlet of the ventilating path.

The inlet of the ventilating path is provided with an auxiliary cooling fan 17 which acts as a cooling air conducting means, i.e., a suction fan for introducing cooling air into the power unit 7. The auxiliary cooling fan 17 introduces air into the ventilating path through the inlet at the front section of the shield case 70. The air in the ventilating path is exhausted from the outlet at the rear section of the case 70.

The auxiliary cooling fan 17 and the region 150B under the projection lens unit 6 are connected to each other by a duct cover 170. The duct cover 170 forms a duct section defining an air path as shown in FIG. 3 to directly introduce fresh air from the cooling air intake port 150 to the power unit 7.

An air outlet 160 with an exhaust fan 16 are provided at the rear end of the apparatus, i.e., behind the power unit 7 and the light source lamp unit 8. The air outlet is provided at the rear end of the apparatus so that air is not exhausted onto users. The exhaust fan 16 is attached to the housing 802 so as to cover the opening formed on the side face of the housing 802 of the light source lamp unit 8 and exhausts the air in the outer case 2 through the housing 802.

In the above-mentioned projection apparatus 1, the cooling air intake port 150 may include a suction fan 15 provided under the prism unit 910. The prism unit 910 may be surrounded on three sides with liquid crystal light valves 925R, 925G and 925B at given distances. The front side of the prism unit 910 faces the projection lens unit 6. The control board 13 covers the upper face of the optical unit 10 and has a cutout section 130 at the position corresponding to the prism unit 910. A video board 11 may be overlaid upon the control board 13.

Air introduced from the cooling air intake port 150 is drawn to the exhaust fan 16 and rises along the side faces of the prism unit 910 as shown by arrow A1 of FIG. 7 to cool the prism unit 910, the liquid crystal valves 925R, 925G and 925B, and the polarizing plates 981–983. The cooling air that reaches the upper portion of the prism unit 910 is drawn by the exhaust fan 16 toward the light source lamp unit 8 through the space between the video board 11 and the control board 13, as shown by arrow A2 in FIG. 7. The air cools the light lamp unit 8 and is exhausted from the air outlet 160. The circuits on the boards 11 and 13 can therefore be cooled by the cooling air introduced from the bottom wall of the outer case 2 to the air path. Because the cooling air cools the hot light source lamp unit 8 after cooling the boards 11 and 13 a high cooling efficiency can be achieved.

The cooling air from the cooling air intake port 150 provided at the bottom wall of the outer case 2 cools at least the prism unit 910, the liquid crystal light valves 925R, 925G and 925B, the polarizing plates 981–983 and the light source lamp unit 8. Because these parts are densely arranged in the narrow region, they can be effectively cooled, resulting in improved reliability of the optical elements.

The cooling air (fresh air) is also drawn from the cooling air intake port 150 by means of the auxiliary cooling fan 17 provided on the power unit 7. The air is introduced into the power unit 7 through the duct cover 170, i.e., the ventilating path in the shield case 70 as shown by arrow A3 of FIG. 6. The cooling air is drawn by the exhaust fan 16 through the interior of the power unit 7 from the extension 72 to the main body 71 in order to cool the power unit 7, and is exhausted from the air outlet 160.

The heat sinks provided on the electronic components in the power unit 7 must also be cooled. Because the cooling air (fresh air) from the cooling air intake port 150 is directly introduced to the ventilating path in the shield case 70, the heat sinks can be effectively and securely cooled. Direct supply of the low-temperature fresh air to the power unit 7 efficiently dissipates heat from the heat sinks as compared with the introduction of air that has already cooled other parts.

Because the auxiliary cooling fan 17 and the first half of the cooling air intake port 150 are connected to each other through the duct cover 170, only fresh air can be introduced from the exterior of the outer case 2 to the ventilating path in the shield case 70. Thus, the power unit 7 is efficiently cooled.

The use of the auxiliary cooling fan 17 enables a stable supply of a large volume of fresh air to the ventilating path ensuring efficient cooling of the power unit 7.

Further, the auxiliary cooling fan 17 is connected to the cooling air intake port 150 through the duct cover 170. Such a configuration securely prevents dust from being sucked through the space between the projection lens unit 6 and the outer case 2 when the fan 17 is operated. Dust is prevented from adhering onto the optical system and a high quality display image is obtained with high reliability.

Figure 6:
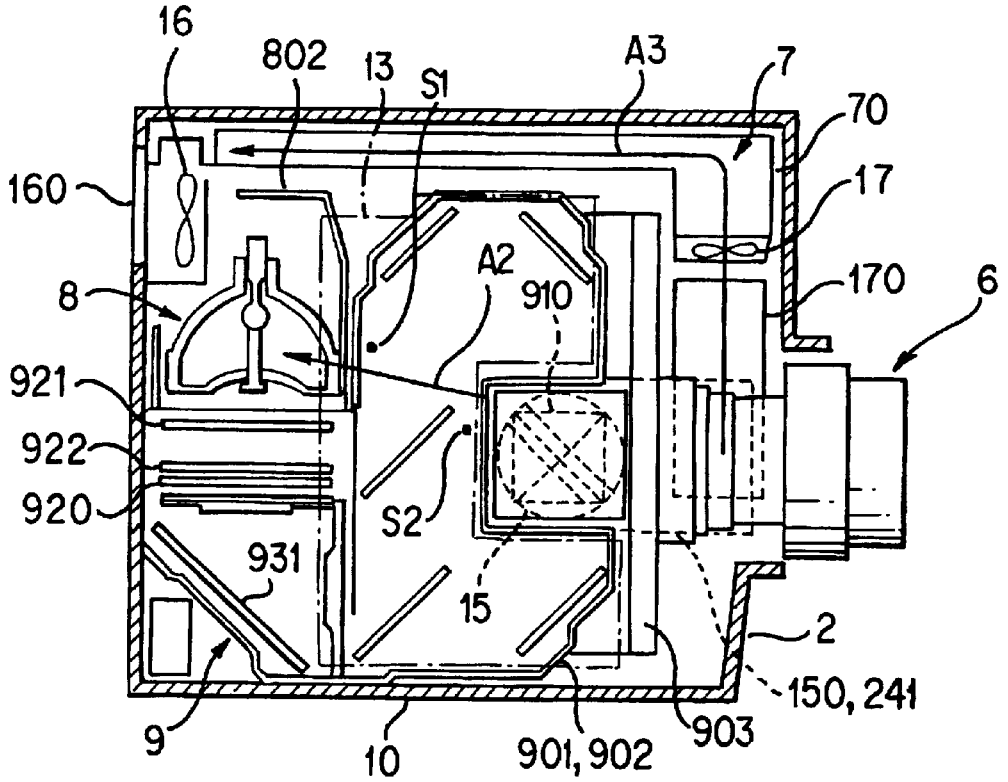
FIG. 6 is a planar cross-sectional view showing the stream of cooling air in the projection display apparatus in accordance with the preferred embodiment of the invention.

As shown in FIGS. 3 and 6, temperature-sensing elements S1 and S2 are directly mounted on the control board 13 near heating sources, i.e., the prism unit 910, the liquid crystal light valves 925R, 925G and 925B, and the light source lamp unit 8. The temperature sensing elements S1 and S2 monitor extraordinary temperature fluctuations of the air heated by the heat sources. Direct mount of the temperature-sensing elements S1 and S2 on the control board 13 eliminates the need for additional wiring.

Figure 8:
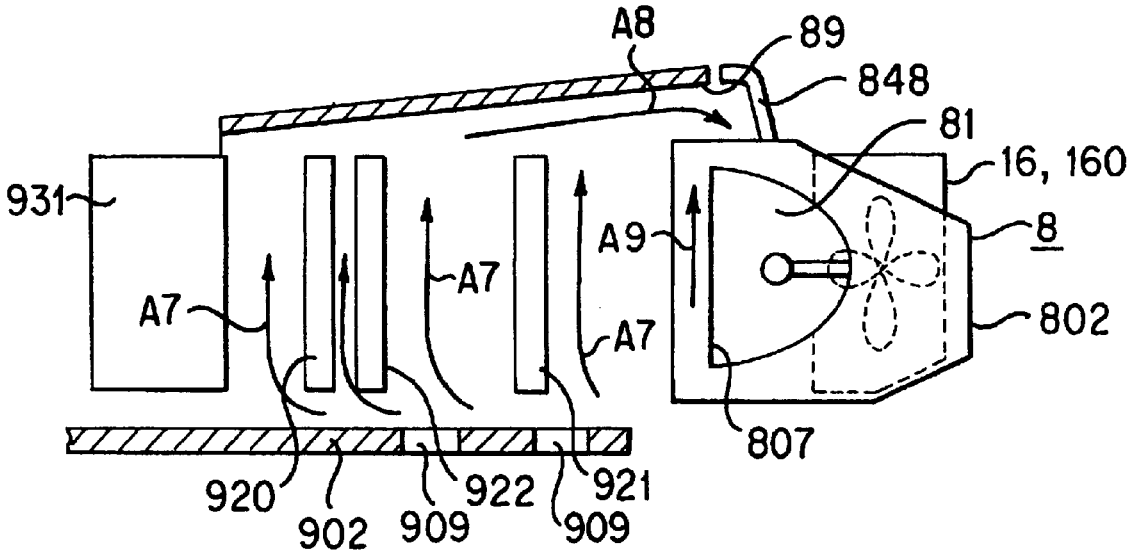
FIG. 8 is a cross-sectional view showing the stream of cooling air in the projection display apparatus in accordance with the preferred embodiment of the invention.

In the optical unit 10 in this embodiment as shown in FIG. 8, ventilating paths that include vertical gaps are provided between the two integrator lenses 921 and 922 and between the integrator lens 922 and the polarized light conversion device 920. A plurality of intake ports 909 are provided at regions below the integrated lenses 921 and 922 and the polarized light conversion device 920. These gaps and intake ports 909 form optical paths which also circulate cooling air along at least one face of the light incident face and the light emerging face of each of the integrator lenses 921 and 922 and the polarized light conversion device 920.

A guide plate 89 is provided above the integrated lenses 921 and 922 and the polarized light conversion device 920 to introduce cooling air. The cooling air is circulated along at least one face of the light incident face and the light emerging face of each optical element to a hood 848 which is provided on a housing 802 of the light source lamp unit 8.

The integrator lenses 921 and 922 and the polarized light conversion device 920 are cooled with the cooling air drawn from the cooling air intake port 150 by the suction fan 15.

The cooling air introduced from the cooling air intake port 150 into the outer case 2 is drawn by the exhaust fan 16 provided behind the light source lamp unit 8 and introduced into the optical lens unit 9 through the intake ports 909 of the lower light guide 902. The cooling air rises in the ventilating paths along the light incident face and emerging face of the integrator lenses 921 and 922 and the polarized light conversion device 920 as shown by arrows A7 of FIG. 8.

Because the polarized light conversion device 920 partially absorbs incident S-polarized light through the polarized light separation film 9204 and the reflection film 9205 (see FIG. 5), it becomes heated. Accordingly, ventilating paths are provided along the polarized light conversion device 920 to securely cool it with circulating cooling air.

The cooling air which rises between the polarized light conversion device 920 and the integrator lenses 921 and 922 is introduced to the hood 848 of the housing 802 along the guide plate 89, as shown by arrow A8 of FIG. 8. The air that has risen then enters into the housing 802 to cool the light source lamp 81 and is exhausted via the air outlet 160.

Because the cooling air which cools the polarized light conversion device 920 and the integrator lenses 921 and 922 is conducted to the light source lamp unit 8 by the guide plate 89, it can securely and effectively cool the light source lamp unit 8.

A portion of the cooling air that is introduced into the optical lens unit 9 is drawn toward the light source lamp unit 8 by the exhaust fan 16 and rises along the glass face 807 of the light source lamp unit 81 to cool the glass face 807, as shown by arrow A9 of FIG. 8. The air which cools the glass face 807 is drawn into the housing 802 through the hood 848 of the housing 802 and is also drawn into the gaps between the light source lamp 81 and the housing 802 to cool the light source lamp 81. The air is then exhausted through the air outlet 160.

Accordingly, the light source lamp 81 and the optical elements are efficiently maintained at a cool temperature, resulting in more reliability for the lamp 81 and the optical elements and requiring less frequent changing of the light source lamp 81.

Although the above-mentioned embodiment describes an apparatus in which the inlet of the ventilating path of the power unit 7 is formed on the end face of the shield case 70 at the side of the projection lens unit 6, the inlet may be provided on many alternative surfaces, for example, on the front side face of the shield case at the projection face. In this case, the cooling air intake port may be provided on the side face of the outer case 2 at the projection face side to directly connect the cooling air intake port with the inlet of the ventilating path.

The power 7 is cooled with great efficiency because a cooling air conducting means is provided for directly introducing fresh air into a ventilating path provided inside the power unit. Direct introduction of fresh air into the ventilating path permits cooling of the interior of the power unit by fresh air, which is cooler than the air in the outer case 2, and accordingly results in greater cooling efficiency.

Also, a ventilating path is provided to direct the cooling air along the polarized light conversion device in the outer case 2. The ventilating path securely circulates the cooling air near the polarized light conversion device regardless of the structure of the projection display apparatus, resulting in a satisfactory cooling effect.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A [projection display apparatus] *projector* comprising:

an optical [unit] *system* that includes a light source and a projection lens, the optical [unit] *system* forming an optical image in response to image information by optically treating light beams emitted from the light source lamp, and expansively projecting the optical image through the projection lens;

a circuit board provided on said optical [unit] *system*, said circuit board comprises a temperature-sensing element adjacent to said light source lamp;

a power [unit] *supply*;

an outer case that stores the optical [unit] *system* and the power [unit] *supply* and includes a ventilating fan that ventilates the interior of the outer case;

a polarized light conversion device facing an emitting surface of the light source lamp that includes a light incident face and a light emitting face, the polarized light conversion device separating the light beams emitted from said light source lamp unit into two types of straight polarized light components and aligning a polarizing direction of the straight polarized light components; and a ventilating path provided inside the outer case that circulates cooling air along at least one face among the light incident face and light emitting face of the polarized light conversion device.

2. The [projection display apparatus] *projector* according to claim 1, the ventilating fan being located adjacent to the light source lamp.

3. The [projection display apparatus] *projector* according to claim 1, further comprising:

a guide that introduces the cooling air circulated along at least one face among the light incident face and light emitting face of the polarized light conversion device to the light source lamp.

4. The [projection display apparatus] *projector* according to claim 1, the outer case comprising:

an operating section having a plurality of switches including a main power on/off switch, and a protruded section protruding from the main switch provided between the main switch and other switches adjacent to the main switch.

5. The [projecting display apparatus] *projector* according to claim 4, the protruded section being provided along a periphery of the main switch.

6. A [projection display apparatus] *projector* comprising:

an optical [unit] *system* that includes a light source lamp and a projection lens, the optical [unit] *system* forming an optical image in response to image information by optically treating light beams emitted from the light source lamp and expansively projecting the optical image through the projection lens;

a power [unit] *supply*;

an outer case that stores the optical [unit] *system* and the power [unit] *supply*;

a polarized light conversion device facing an emitting surface of the light source lamp that includes at light incident face and a light emitting face, the polarized light conversion device separating the light beams emitted from the light source lamp into two types of straight polarized light components and aligning a polarizing direction of the straight polarized light components;

a first ventilizating path provided inside the outer case that circulates cooling air along at least one face among the light incident face and the light emitting face of the polarized light conversion device;

a second ventilating path provided inside the power [unit] *supply* that circulates cooling air;

a first cooling air intake port that provides cooling air from outside of the outer case to the first ventilating path; and a second cooling air intake port that directly conducts cooling air from the outside of the outer case to the second ventilating path.

7. The [projection display apparatus] *projector* according to claim 6, further comprising a circuit board provided on said optical [unit] *system*, said circuit board being provided with a temperature-sensing element adjacent said light source lamp.

8. The [projection display apparatus] *projector* according to claim 6, the outer case comprising a ventilating fan located adjacent to the light source lamp.

9. The [projection display apparatus] *projector* according to claim 6, further comprising:

a guide that introduces the cooling air circulated along at least one face among the light incident face and light emitting face of the polarized light conversion device to the light source lamp.

10. The [projection display apparatus] *projector* according to claim 6, said outer case comprising:

an operating section having a plurality of switches including a main power on/off switch, and a protruded section protruding from the main switch provided between the main switch and other switches adjacent to the main switch.

11. The [projection display apparatus] *projector* according to claim 10, the protruded section being provided along a periphery of the main switch.

* * * * *